United States Patent
Ahn

(10) Patent No.: US 11,029,732 B2
(45) Date of Patent: Jun. 8, 2021

(54) DISPLAY DEVICE AND OPERATING METHOD THEREOF

(71) Applicant: SAMSUNG DISPLAY CO., LTD., Yongin-si (KR)

(72) Inventor: Sung Sang Ahn, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/517,937

(22) Filed: Jul. 22, 2019

(65) Prior Publication Data

US 2020/0209923 A1 Jul. 2, 2020

(30) Foreign Application Priority Data

Jan. 2, 2019 (KR) .................. 10-2019-0000236

(51) Int. Cl.
*G06F 1/16* (2006.01)
*G06F 3/0488* (2013.01)
*G06K 9/00* (2006.01)

(52) U.S. Cl.
CPC ........ *G06F 1/1652* (2013.01); *G06F 3/04883* (2013.01); *G06K 9/0002* (2013.01)

(58) Field of Classification Search
CPC ............... G06F 3/04883; G06F 3/0488; G06F 3/04845; G06F 3/0416; G06F 3/016; G06F 3/03547; G06F 1/1652; G06F 1/1647; G06F 1/1615; G06F 2203/04808; G06F 1/163
See application file for complete search history.

(56) References Cited

U.S. PATENT DOCUMENTS

| | | | |
|---|---|---|---|
| 10,082,833 | B2 | 9/2018 | Chen |
| 2013/0252668 | A1* | 9/2013 | Cheng .................. G06F 1/1647 455/556.1 |
| 2015/0186092 | A1* | 7/2015 | Francis .................. G06F 3/017 345/520 |
| 2016/0037672 | A1* | 2/2016 | Zhang .................. G06F 1/1641 361/679.01 |
| 2016/0320871 | A1* | 11/2016 | Li ......................... G06F 1/1652 |
| 2017/0038939 | A1* | 2/2017 | Fraczek .................. G06F 1/163 |
| 2017/0075474 | A1* | 3/2017 | Shigematsu .......... G06F 3/0485 |
| 2017/0160819 | A1* | 6/2017 | Yi ..................... H04W 12/0608 |
| 2018/0374452 | A1 | 12/2018 | Choi et al. |

FOREIGN PATENT DOCUMENTS

| KR | 10-2011-0123058 | 11/2011 |
|---|---|---|
| KR | 10-2014-0028216 | 3/2014 |

* cited by examiner

*Primary Examiner* — Xuemei Zheng
(74) *Attorney, Agent, or Firm* — F. Chau & Associates, LLC

(57) ABSTRACT

A display device includes: a display panel; a first frame to which a first end of the display panel is fixed; and a second frame connected to the first frame, wherein the second frame is moveable in a first direction or a second direction that is opposite to the first direction with respect to the first frame. A second end of the display panel is in a moveable floating state guided by the second frame. The area of an externally exposed surface of the display panel is widened when the second frame is moved in the first direction, and is narrowed when the second frame is moved in the second direction.

18 Claims, 8 Drawing Sheets

DISPLAY DEVICE AND OPERATING METHOD THEREOF

CROSS-REFERENCE TO RELATED APPLICATION

The present application claims priority under 35 U.S.C. § 119(a) to Korean patent application 10-2019-0000236 filed on Jan. 2, 2019 in the Korean Intellectual Property Office, the entire disclosure of which is incorporated herein by reference.

BACKGROUND

1. Technical Field

The present disclosure generally relates to a display device and an operating method thereof.

2. Related Art

With the development of information technology, the importance of display devices which serve as a connection medium between users and information increases. Accordingly, display devices such as liquid crystal display devices, organic light emitting display devices, and plasma display devices are increasingly used.

Recently, as flexible display panels are developed, flexible, rollable, and foldable display devices using flexible display panel technology have been proposed.

Flexible display devices can provide convenience to users by automatically rolling/unrolling or folding/unfolding the display panel, using a motor, etc. However, a display device may unintentionally collide with a user during the unrolling or unfolding operation based on the grasping state of the user. This may cause discomfort, or may cause the user to lose control of the display device. For example, the device may fall out of the hand of the user.

SUMMARY

Embodiments provide a display device capable of determining whether an externally exposed surface of a display panel is to extend by considering a grasping state of a user, and an operating method of the display device.

According to an aspect of the present disclosure, there is provided a display device including: a display panel; a first frame to which a first end of the display panel is fixed; and a second frame connected to the first frame, wherein the second frame is moveable in a first direction or a second direction that is opposite to the first direction with respect to the first frame, wherein a second end of the display panel is in a moveable floating state guided by the second frame, wherein an area of an externally exposed surface of the display panel is widened when the second frame is moved in the first direction, and is narrowed when the second frame is moved in the second direction.

When a predetermined pattern is input to the display panel, the second frame may be moved in the first direction from the first frame.

The predetermined pattern may be a pattern in which a touch input from a first region of the externally exposed surface to a second region of the externally exposed surface sequentially occurs. The second region may be located in the first direction from the first region.

The predetermined pattern may be a pattern in which a touch input is maintained in a first region of the externally exposed surface for at least a predetermined time, and a touch input to a second region of the externally exposed surface from the first region occurs sequentially to the touch input maintained in the first region. The second region may be located in the first direction from the first region.

The predetermined pattern may be a pattern in which a touch input repeatedly occurs in a first region of the externally exposed surface at a predetermined time interval.

The display panel may include a fingerprint recognition region of the externally exposed surface. The predetermined pattern may be a touch input within the fingerprint recognition region, and the touch input may correspond to a predetermined fingerprint pattern.

The predetermined pattern may include touch inputs that occur in a predetermined sequence in a plurality of predetermined regions on the externally exposed surface.

The display device may further include a proximity sensor located at an end portion of the first frame in the second direction.

When both a predetermined pattern is input to the display panel and a proximity signal is generated from the proximity sensor, the second frame may be moved in the first direction from the first frame.

The display device may further include a proximity sensor located at an end portion of the second frame in the first direction.

When both a predetermined pattern is input to the display panel and no proximity signal is generated from the proximity sensor, the second frame may be moved in the first direction from the first frame.

The second frame may include: a first sub-frame covering at least a portion of a display surface of the display panel; and a second sub-frame supporting at least a portion of a back surface of the display panel.

According to an aspect of the present disclosure, there is provided a method for operating a display device, the method including: inputting a predetermined pattern to an externally exposed surface of a display panel; moving a second frame, which is connected to a first frame to which a first end of the display panel is fixed, in a first direction with respect to the first frame; and allowing the second end of the display panel, which is in a floating state, to be guided by the second frame, so that an area of the externally exposed surface is widened.

The moving of the second frame in the first direction may be performed when a proximity signal is generated from a proximity sensor located at an end portion of the first frame in a second direction. The second direction may be a direction opposite to the first direction.

The moving of the second frame in the first direction may be performed when no proximity signal is generated from a proximity sensor located an end portion of the second frame in the first direction.

The predetermined pattern may be a pattern in which a touch input is maintained in a first region of the externally exposed surface for at least a predetermined time, and a touch input to a second region of the externally exposed surface from the first region occurs sequentially to the touch input maintained in the first region. The second region may be located in the first direction from the first region.

The predetermined pattern may be a pattern in which a touch input repeatedly occurs in a first region of the externally exposed surface at a predetermined time interval.

The display panel may include a fingerprint recognition region of the externally exposed surface. The predetermined pattern may be a touch input within the fingerprint recognition region, and the touch input may correspond to a predetermined fingerprint pattern.

The predetermined pattern may include touch inputs that occur in a predetermined sequence in a plurality of predetermined regions on the externally exposed surface.

BRIEF DESCRIPTION OF THE DRAWINGS

Example embodiments will now be described more fully hereinafter with reference to the accompanying drawings; however, embodiments of the present disclosure may take different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
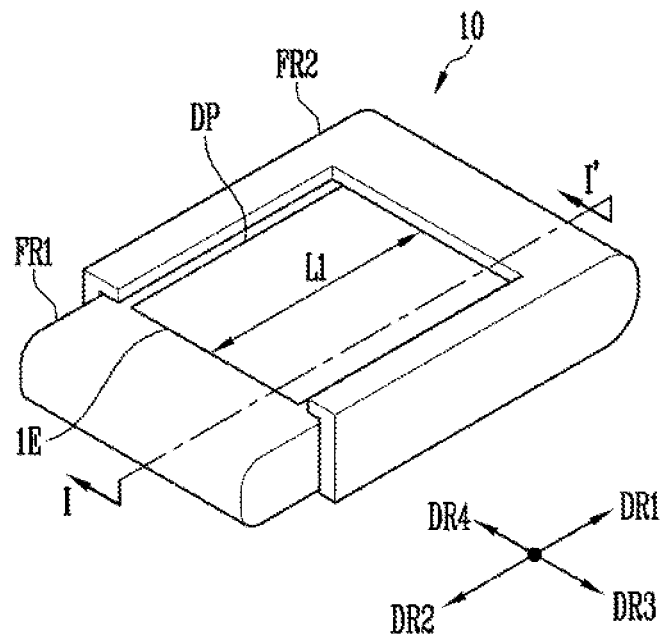
FIG. 1 is a view illustrating a state of a display device according to an embodiment of the present disclosure.

Flexible displays are becoming a more common means of providing a convenient method of displaying information. However, devices flexible displays may introduce challenges with respect to how users handle the devices. For example, the present disclosure describes a flexible display that is integrated into a device that are capable of undergoing a changing form factor. In example embodiments, the change in form factor is driven by a motor.

If a form factor change is driven by a motor automatically, the change may cause a user to lose control over the device, especially if the change is unintentional. Therefore, the present disclosure provides systems and methods for a display device that incorporates a flexible display that in a way that enables a screen size to be increased or decreased without causing the user to lose control of the device. Embodiments of the present disclosure describe various means for ensuring that the device does not initiate an unintentional or dangerous change in the form factor.

For example, the change in the form factor may be initiated upon detection of a gesture pattern on the flexible display screen. In some embodiments, the gesture must be accompanied by a signal (or lack of a signal) from a proximity sensor.

Therefore, when compared with conventional display devices, the present disclosure provides for a display device that provides for improved convenience by enabling a changeable form factor, while mitigating the risk of an unintentional change in the form factor. This may prevent the user from being inconvenienced, and may prevent the device from being damaged (i.e., if the user loses control of the device).

Hereinafter, exemplary embodiments are described in detail with reference to the accompanying drawings so that those skilled in the art may easily practice the present disclosure. The present disclosure may be implemented in various different forms and is not limited to the exemplary embodiments described in the present specification.

Parts irrelevant to the description will be omitted to clearly describe the present disclosure, and the same or similar constituent elements will be designated by the same reference numerals throughout the specification. Therefore, the same reference numerals may be used in different drawings to identify the same or similar elements.

In addition, the size and thickness of each component illustrated in the drawings are arbitrarily shown for better understanding and ease of description, but the present disclosure is not limited thereto. Thicknesses of several portions and regions are exaggerated for clear expressions.

Figure 2:
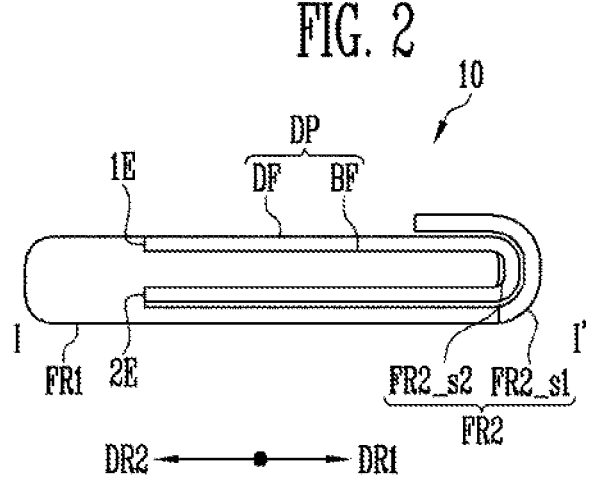
FIG. 2 is a sectional view taken along line I-I' of the display device having the state shown in FIG. 1.
Figure 3:
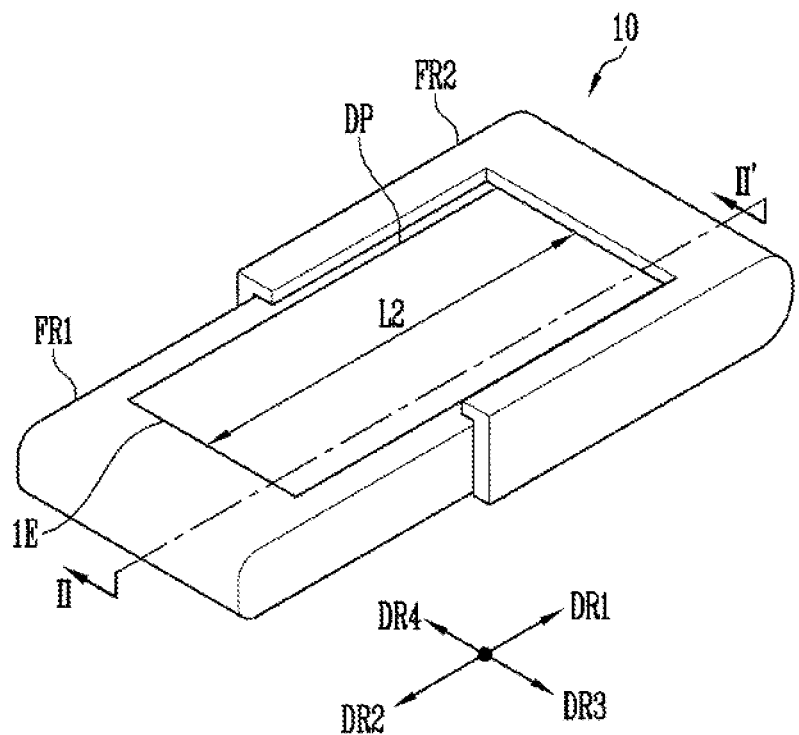
FIG. 3 is a view illustrating another state of the display device.
Figure 4:
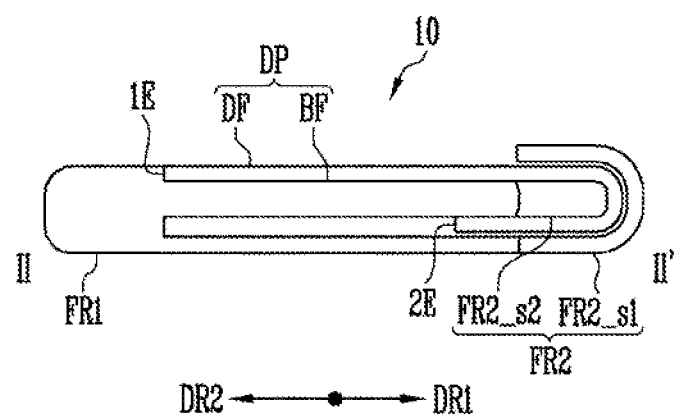
FIG. 4 is a sectional view taken along line II-II' of the display device having the state shown in FIG. 3.
Figure 5:
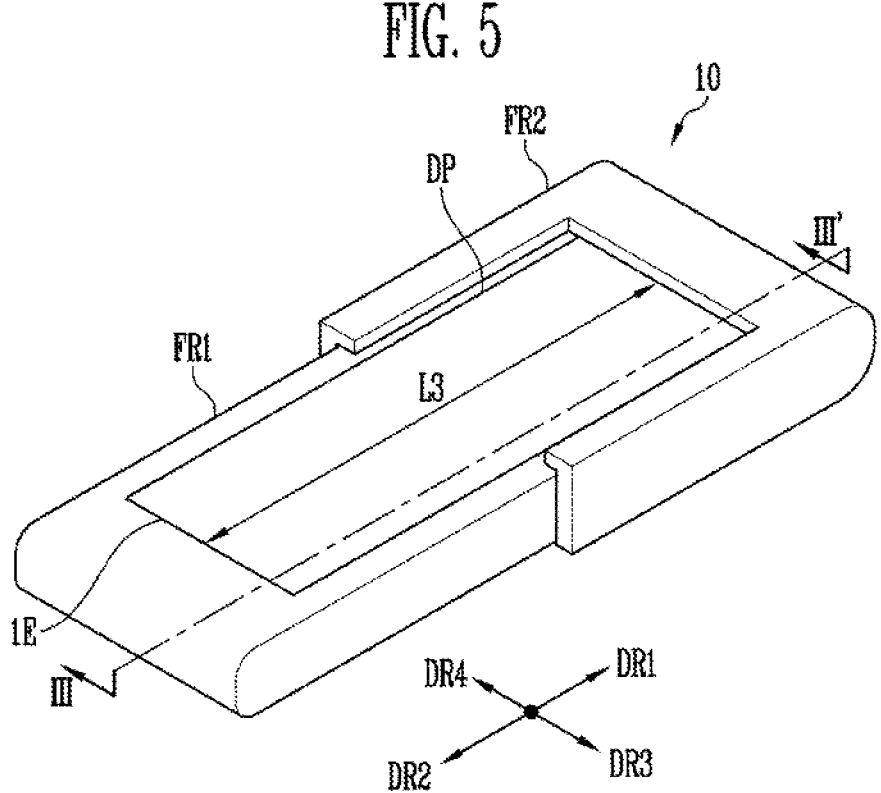
FIG. 5 is a view illustrating still another state of the display device.
Figure 6:
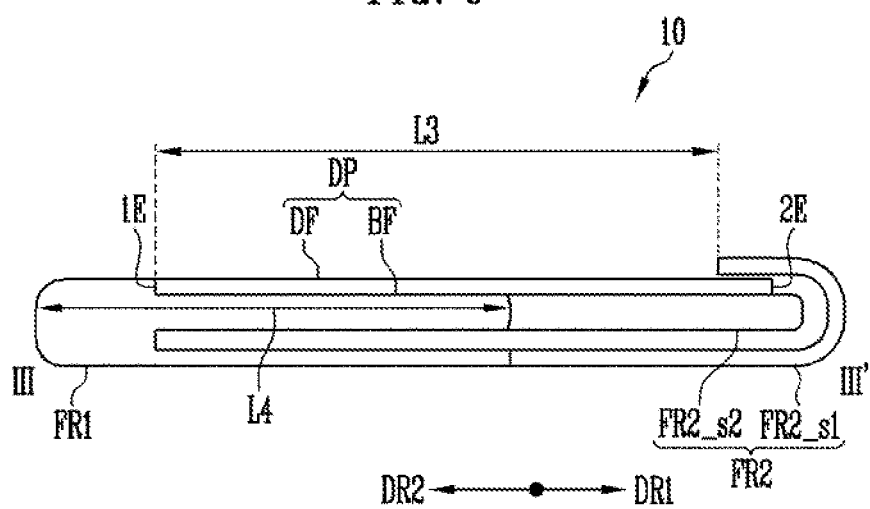
FIG. 6 is a sectional view taken along line III-III' of the display device having the state shown in FIG. 5.

FIG. 1 is a view illustrating a state of a display device according to an embodiment of the present disclosure. FIG. 2 is a sectional view taken along line I-I' of the display device having the state shown in FIG. 1. FIG. 3 is a view illustrating another state of the display device. FIG. 4 is a sectional view taken along line II-II' of the display device having the state shown in FIG. 3. FIG. 5 is a view illustrating still another state of the display device. FIG. 6 is a sectional view taken along line of the display device having the state shown in FIG. 5.

Referring to FIGS. 1 to 6, the display device 10 according to an embodiment of the present disclosure may include a first frame FR1, a second frame FR2, and a display panel DP.

A first direction DR1 and a second direction DR2 may be directions opposite to each other, and a third direction DR3 may be a direction orthogonal to the first direction DR1 and the second direction DR2. A fourth direction DR4 may be a direction opposite to the third direction DR3.

The display panel DP may be flexible, rollable or foldable. For example, the display panel DP may be configured in a form in which pixels are formed on a flexible substrate. For example, the substrate may be made of a material such as a polymer organic material or fiber glass reinforced plastic (FRP). The display panel DP may be configured in the form of a liquid crystal display device, an organic light emitting display device, a quantum dot display device, a self-luminescent display device, etc. The display panel DP may include a touch sensing unit therein, or be coupled to a separate touch panel, so that a touch input can be recognized.

The display panel DP may include a display surface DF and a back surface BF. A portion of the display surface DF, which is not covered by the first frame FR1 and the second frame FR2 may be defined as an externally exposed surface. In FIG. 1, the externally exposed surface may have an area corresponding to a value obtained by multiplying a length L1 of the first direction DR1 by a length of the third direction DR3. However, this calculation method is used when the display panel DP is a rectangular display panel, and another calculation method may be used when the display panel DP has another shape such as a circular display panel used in a smart watch, etc.

The first frame FR1 may be a frame to which a first end 1E of the display panel DP is fixed. The first frame FR1 may be made of a rigid material. The first frame FR1 may support at least a portion of the back surface BF of the display panel DP.

The second frame FR2 may be a frame connected to the first frame FR1, and may be movable in the first direction DR1 or the second direction DR2 with respect to the first frame FR1. For example, the second frame FR2 and the first frame FR1 may be connected to each other by a guide rail, etc., so that the second frame FR2 can slide in the first direction DR1 or the second direction DR2 with respect to the first frame FR1. The second frame FR2 may also be made of a rigid material.

The second frame FR2 may include a first sub-frame FR2_s1 and a second sub-frame FR2_s2. The first sub-frame FR2_s1 may cover at least a portion of the display surface DF of the display panel DP. The second sub-frame FR2_s2 may support at least a portion of the back surface BF of the display panel DP.

In some embodiments, the first frame FR1 may include a power production device such as a motor, which may be configured to move the second frame FR2 in the first direction DR1 or the second direction DR2. The first frame FR1 may include various devices such as an application processer (AP), a battery, and a communication module, in addition to the display panel DP. The second frame FR2 may not include electronic devices therein. Alternatively, the second frame FR2 may include only a minimum of electronic devices therein. Thus, the motor is included in the first frame FR1, so that a load of the second frame can be small when the second frame FR2, having a relatively light weight, is moved. In another embodiment, the second frame FR2 may include a driving apparatus such as a motor therein, to perform the same function.

A second end 2E of the display panel DP may be in a floating state, and may be moveable in a manner guided by the second frame FR2. That the second end 2E of the display panel DP is in the floating state may mean that the second end 2E of the display panel DP is in a state in which it is not fixed to any frame. That is, the second end 2E of the display panel DP may be in a state in which it is freely movable within the guiding portion of the second frame FR2. For example, the second end 2E of the display panel DP may be guided through a space between the first sub-frame FR2_si and the second sub-frame FR2_s2.

When the second frame FR2 is moved in the first direction DR1 the area of the externally exposed surface of the display panel DP may be increased. When the second frame FR2 is moved in the second direction DR2, the area of the externally exposed surface of the display panel DP may be decreased.

Referring to FIG. 3, it can be seen that the second frame FR2 has been moved in the first direction DR1. Accordingly, a length L2 of the externally exposed surface of the display panel DP in the first direction DR1 is increased compared with the length L1 shown in FIG. 1. In FIGS. 1 and 3, the display panel DP has the same length in the third direction DR3.

Hence, when the display device 10 is changed from the state shown in FIG. 1 to the state shown in FIG. 3, the area of the externally exposed surface of the display panel DP is widened or increased. On the other hand, when the display device 10 is changed from the state shown in FIG. 3 to the state shown in FIG. 1, it may be expressed that the area of the externally exposed surface of the display panel DP is narrowed or decreased.

Referring to FIG. 5, it can be seen that, when the display panel DP is changed from the state shown in FIG. 3 to the state shown in FIG. 5, the second frame FR2 is further moved in the first direction DR1. Accordingly, a length L3 of the externally exposed surface of the display panel DP in the first direction DR1 is further increased relative to the length L2 of FIG. 3. The length L3 may include at least a portion of the length of the second sub-frame FR2_s2 in the first direction DR1. Thus, according to some embodiments, the length L3 is larger than a length L4 of the first frame FR1 in the first direction DR1.

Figure 7:
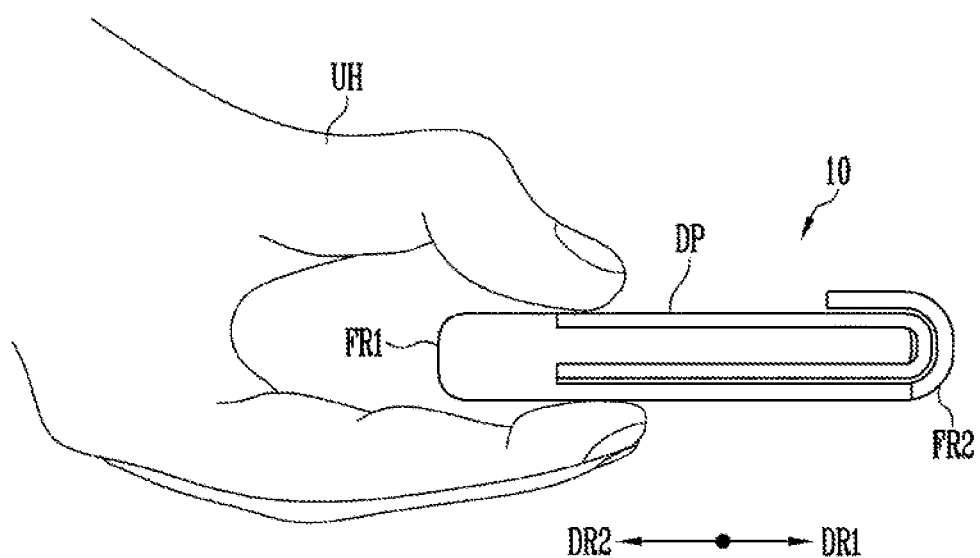
FIGS. 7 and 8 are views illustrating a problem that may occur according to a method in which a user grasps the display device.
Figure 8:
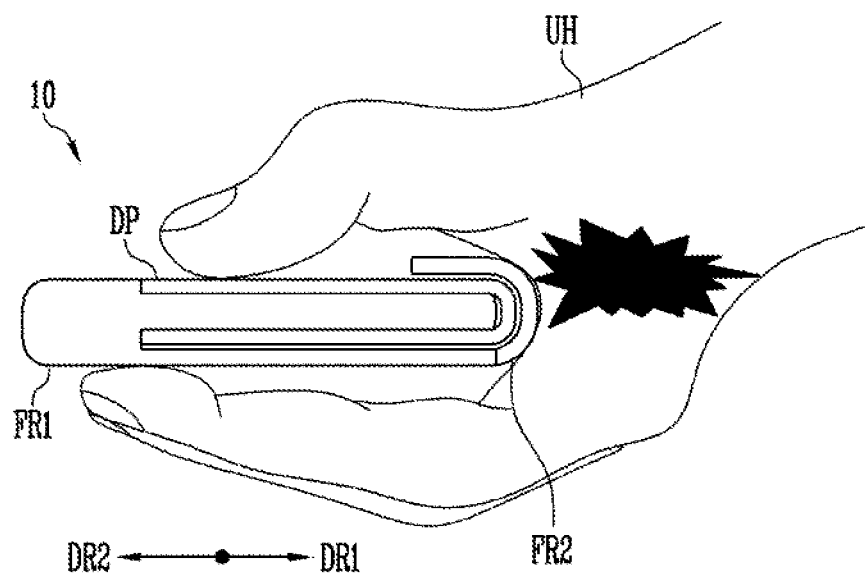

FIGS. 7 and 8 are views illustrating a problem that may occur according to a method in which a user grasps the display device.

Referring to FIG. 7, a case where a hand UH of the user grasps the display device 10 in the second direction DR2 with respect to the display device 10 is illustrated. Since the second frame FR2 is moved in the first direction DR1, no collision of the hand UH and the display device 10 occurs.

By contrast, referring to FIG. 8, a case where the hand UH of the user grasps the display device 10 in the first direction DR1 with respect to the display device 10 is illustrated. When the second frame FR2 is moved in the first direction DR1, the second frame FR2 and the hand UH of the user may collide with each other. As a result, the user may lose control of the display device 10, and in some cases, the display device 10 may fall out of the hand UH of the user.

Accordingly, it is desirable to prevent the case where the second frame FR2 is moved when the user unintentionally touches the display panel DP or presses a specific button of the display device 10, especially when the display device 10 is oriented as shown in FIG. 8.

FIGS. 9 to 13 are views exemplarily illustrating predetermined patterns. A user may recognize and use the predetermined patterns shown in FIGS. 9 to 13, so that the case where the user unintentionally causes the second frame FR2 to be moved can be prevented.

However, the predetermined patterns shown in FIGS. 9 to 13 are merely illustrative, and those skilled in the art may derive various patterns with reference to the present disclosure.

Figure 9:
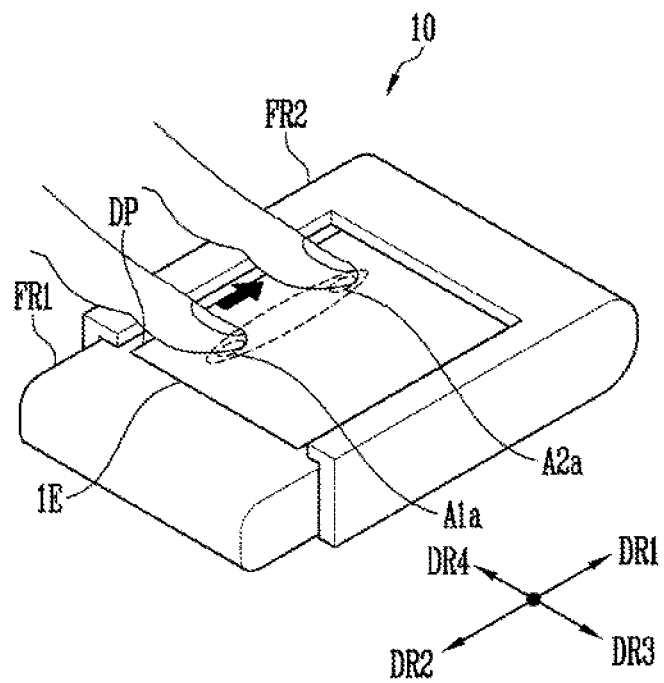
FIGS. 9 to 13 are views exemplarily illustrating predetermined patterns.

Referring to FIG. 9, a predetermined pattern may be a pattern in which a touch input from a first region A1a of the externally exposed surface to a second region A2a of the externally exposed surface sequentially occurs. In some embodiments, the second region A2a may be located in the first direction DR1 from the first region A1a.

Such a dragging gesture in the first direction DR1 may correspond to movement of the second frame FR2 in the first direction DR1 and thus the predetermined pattern can be intuitively understood by the user. However, in some embodiments, the dragging gesture that causes the display device 10 to expand in the first direction DR1 may be limited to a specific region on the display panel.

Limiting the gesture to one of those illustrated in FIGS. 9-13, and in some cases, to within a specific region, may help prevent inadvertent triggering of the expansion of the display device. In some examples, the regions A1a and A2a, or other indications of the motions illustrated in FIGS. 9-13, may be indicated on the display panel DP to aid the user in understanding the dragging gesture.

Figure 10:
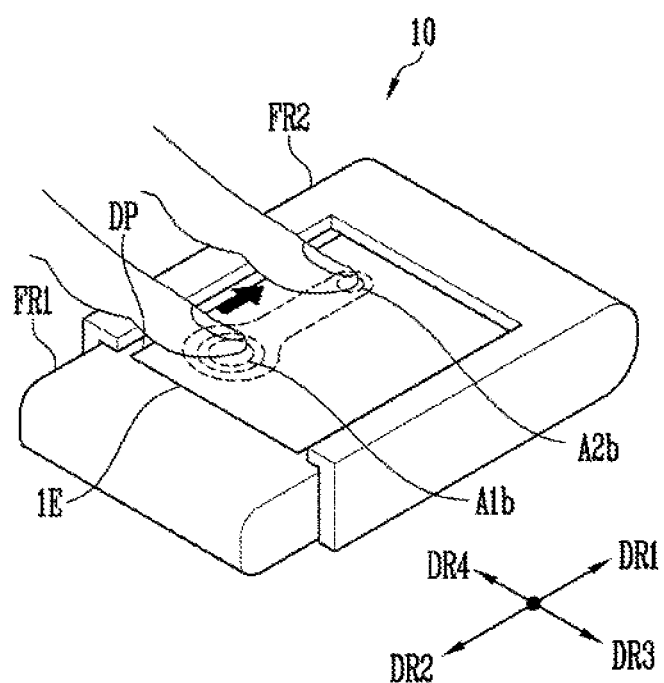

Referring to FIG. 10, the predetermined pattern may be the pattern in which a touch input is maintained in a first region A1b of the externally exposed surface for at least at least a predetermined time, and a touch input from at or near the first region A1b to a second region A2b of the externally exposed surface sequentially occurs. The second region A2b may be located in the first direction DR1 from the first region A1b.

The predetermined pattern shown in FIG. 10 is similar to that shown in FIG. 9, but the touch input is required in the first region A1b for at least the predetermined time. By requiring the gesture to include the time constraint, inadvertent triggering of the expansion can be further prevented.

Figure 11:
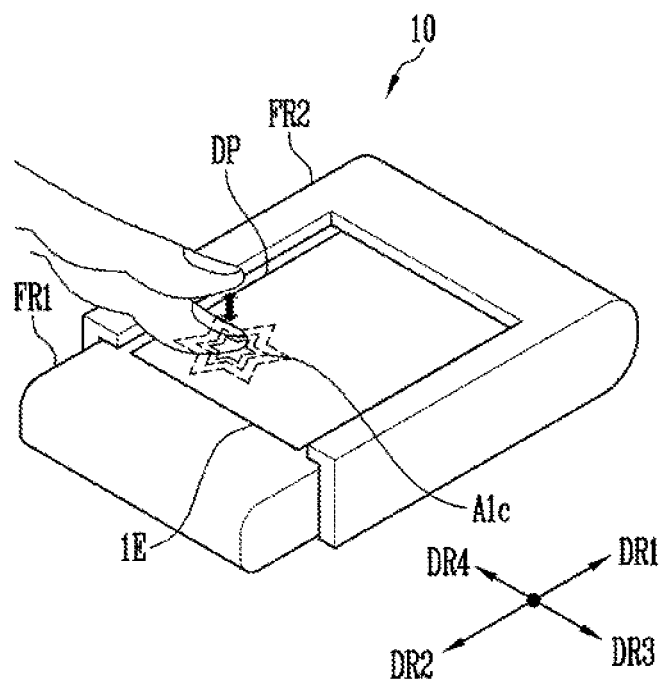

Referring to FIG. 11, a predetermined pattern may be a pattern in which a touch input repeatedly occurs in a first region A1c of the externally exposed surface at a predetermined time interval. The first region A1c may be an arbitrary region on the externally exposed surface.

The first region A1c may mean the same region with respect to repeatedly occurring touch inputs.

For example, when the user taps the first region A1c three times at the predetermined time interval, the second frame FR2 may be moved in the first direction DR1. A one-time tap may be a normal touch input, and a two-time tap may occur unintentionally occur (e.g., when the user change their grasp). However, when a tap is required three times or more, inadvertent triggering of the expansion can be further prevented.

Figure 12:
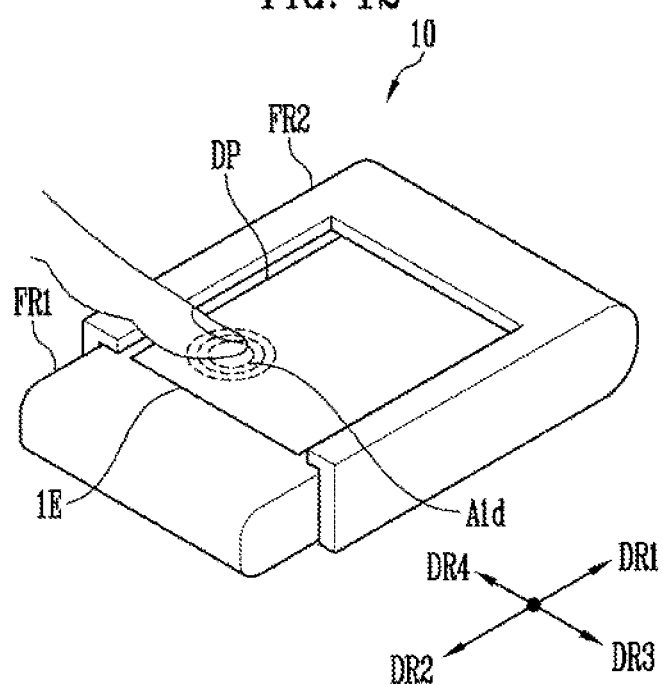

Referring to FIG. 12, the display panel DP may include a fingerprint recognition region A1d at least a portion of the externally exposed surface, and a predetermined pattern may include a touch input at the fingerprint recognition region A1d. The touch input may be restricted to correspond to a predetermined fingerprint pattern.

According to this embodiment, the contact of a fingerprint region of a specific finger may be limited to a specific position, and thus inadvertent trigger ng of the expansion can be prevented.

Figure 13:
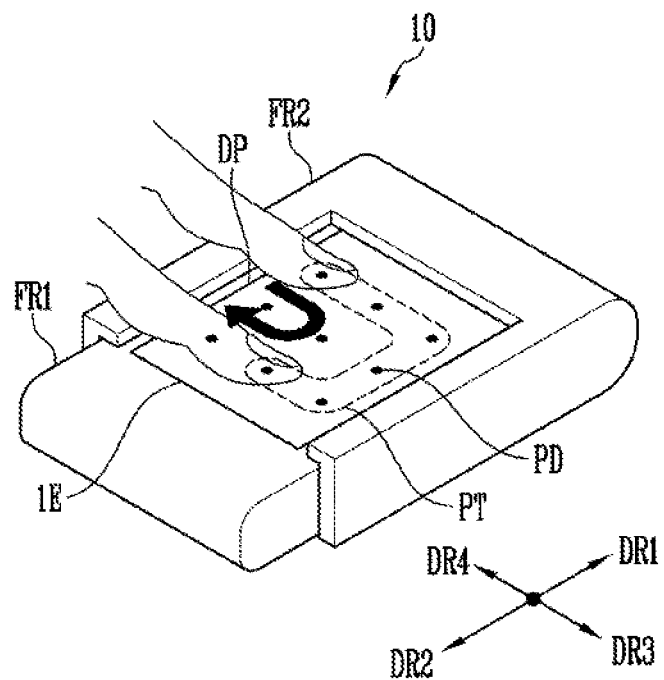

Referring to FIG. 13, a predetermined pattern PT may include touch inputs that occur in a predetermined sequence in a plurality of predetermined regions PD on the externally exposed surface. For example, the predetermined pattern may be a lock release pattern preset by the user. In some examples, the lock release pattern may correspond to a number pattern (or another visible pattern) displayed on the display device 10.

Figure 14:
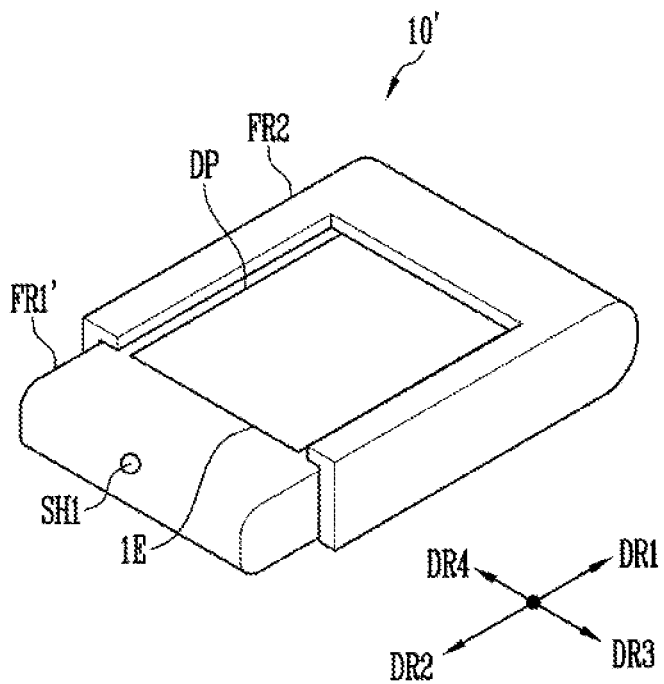
FIG. 14 is a view illustrating a case where a proximity sensor is located at a first frame.

FIG. 14 is a view illustrating a case where a proximity sensor is located at a first frame.

Referring to FIG. 14, a display device 10' may further include a proximity sensor located an end portion of a first frame FR1' in the second direction DR2. The first frame FR1' may include a sensor hole SH1 for the proximity sensor. An existing commercial product may be used as the proximity sensor. When a hand of the user, covers the sensor hole SH1, the proximity sensor may generate a proximity signal (e.g., an electromagnetic wave pattern or a sound wave pattern).

According to this embodiment, when both a predetermined pattern is input to the display panel DP, and a proximity signal is generated from the proximity sensor, the second frame FR2 may be moved in the first direction DR1 from the first frame FR1'.

That is, in the embodiment shown in FIG. 14, the case where the proximity signal is generated may correspond to a case where the hand of the user grasps the display device 10' from the second direction DR2 from the display device 10' as shown in FIG. 7. Therefore, although the second frame FR2 is moved, the probability that the second frame FR2 collides with the hand UH of the user is relatively low.

On the other hand, when the proximity signal is not generated from the proximity sensor, the second frame FR2 may not be moved in the first direction DR1 even though a predetermined pattern is input to the display panel DP. That is, in the embodiment shown in FIG. 14, the case where the proximity signal is not generated may correspond to a case where the hand of the user grasps the display device 10' from the first direction DR1 from the display device 10' as shown in FIG. 8. Therefore, the probability that the second frame FR2 collides with the hand UH of the user would be relatively high if the second frame FR2 is moved (i.e., thereby expanding the display device 10').

Thus, according to this embodiment, safe operation of the display device 10' can be ensured by complementing the predetermined patterns described in FIGS. 9 to 13 with a proximity sensor SH1.

Figure 15:
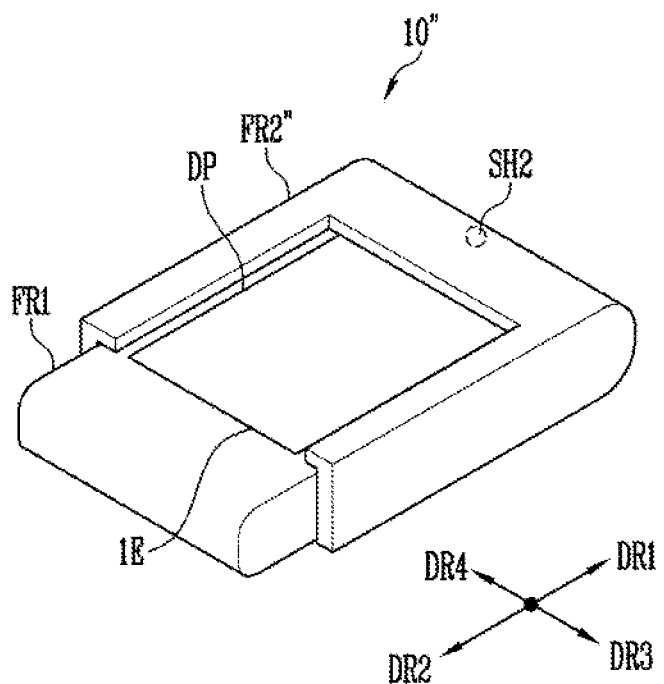
FIG. 15 is a view illustrating a case where the proximity sensor is located at a second frame.

FIG. 15 is a view illustrating a case where the proximity sensor is located on the second frame FR2.

Referring to FIG. 15, a display device 10" may include a proximity sensor located at an end portion of a second frame FR2" in the first direction DR1. The second frame FR2" may include a sensor hole SH2 for the proximity sensor. An existing commercial product may be used as the proximity sensor. When a hand of the user, indicates that a user hand UH is covering the sensor hole SH2, the proximity sensor may generate a proximity signal (e.g., an electromagnetic wave pattern or a sound wave pattern).

According to this embodiment, when a predetermined pattern is input to the display panel DP, and the proximity signal is not generated from the proximity sensor, the second frame FR2" may be moved in the first direction DR1 from the first frame FR1.

That is, in the embodiment shown in FIG. 15, the case where the proximity signal is not generated corresponds to the case where the hand of the user grasps the display device 10" from the second direction DR2 as shown in FIG. 7. Therefore, although the second frame FR2" is moved, the probability that the second frame FR2" collides with the hand of the user is relatively low.

On the other hand, when the proximity signal is generated from the proximity sensor, the second frame FR2" may not be moved in the first direction DR1 even if the predetermined pattern is input to the display panel DP. That is, in the embodiment shown in FIG. 15, the case where the proximity signal is generated corresponds to the case where the hand of the user grasps the display device 10" from the first direction DR1 as shown in FIG. 8. Therefore, the probability that the second frame FR2" will collide with the hand of the user when the second frame FR2" is moved is relatively high (if the systems and methods described herein are not employed).

Thus, according to this embodiment, safe operation of the display device 10" can be ensured by complementing the predetermined patterns described in FIGS. 9 to 13 with a proximity sensor.

In the display device and the operating method thereof, it can be determined whether the externally exposed surface of the display panel is to extend, by considering a grasping state of a user.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:
   a display panel;
   a first frame to which a first end of the display panel is fixed and supporting a back surface of the display panel; and
   a second frame connected to the first frame, wherein the second frame is moveable with respect to the first frame using a linear motion in a first direction or a second direction that is opposite to the first direction,
   wherein a second end of the display panel is in a moveable floating state guided by the second frame such that the second end of the display panel is movable with respect to the second frame,
   wherein an area of an externally exposed surface of the display panel is widened when the second frame is moved in the first direction, and is narrowed when the second frame is moved in the second direction, and
   wherein when a touch having a predetermined pattern is input to the externally exposed surface of the display panel, the second frame is moved in the first direction from the first frame.

2. The display device of claim 1, wherein the predetermined pattern is a pattern in which a touch input from a first region of the externally exposed surface to a second region of the externally exposed surface sequentially occurs,
   wherein the second region is located in the first direction from the first region.

3. The display device of claim 1, wherein the predetermined pattern is a pattern in which a touch input is maintained in a first region of the externally exposed surface for at least a predetermined time, and a touch input to a second region of the externally exposed surface from the first region occurs sequentially to the touch input maintained in the first region,
   wherein the second region is located in the first direction from the first region.

4. The display device of claim 1, wherein the predetermined pattern is a pattern in which a touch input repeatedly occurs in a first region of the externally exposed surface at a predetermined time interval.

5. The display device of claim 1, wherein the display panel includes a fingerprint recognition region of the externally exposed surface,
   wherein the predetermined pattern is a touch input within the fingerprint recognition region, and the touch input comprises a predetermined fingerprint pattern.

6. The display device of claim 1, wherein the predetermined pattern includes touch inputs that occur in a predetermined sequence in a plurality of predetermined regions on the externally exposed surface.

7. The display device of claim 1, further comprising a proximity sensor, wherein the second frame is moved in the first direction based on both a predetermined pattern input to the display panel and a proximity signal generated from the proximity sensor.

8. The display device of claim 1, wherein the second frame includes:
   a first sub-frame covering at least a portion of a display surface of the display panel; and
   a second sub-frame supporting at least a portion of the back surface of the display panel.

9. The display device of claim 1, wherein the second end of the display panel is movable within a guiding portion of the second frame.

10. A display device comprising:
    a display panel;
    a first frame to which a first end of the display panel is fixed;
    a second frame connected to the first frame; and
    a proximity sensor configured to generate a proximity signal, wherein the second frame is moveable in a first direction or a second direction that is opposite to the first direction with respect to the first frame based at least in part on the proximity signal,
    wherein a second end of the display panel is in a moveable floating state guided by the second frame,
    wherein an area of an externally exposed surface of the display panel is widened when the second frame is moved in the first direction, and is narrowed when the second frame is moved in the second direction.

11. The display device of claim 10, wherein the proximity sensor is located at an end portion of the first frame and, when both a predetermined pattern is input to the display panel and the proximity signal is generated from the proximity sensor, the second frame is moved in the first direction from the first frame.

12. The display device of claim 10, wherein, the proximity sensor is located at an end portion of the second frame and, when both a predetermined pattern is input to the display panel and no proximity signal is generated from the proximity sensor, the second frame is moved in the first direction from the first frame.

13. A method for operating a display device, the method comprising:
    inputting a predetermined pattern to an externally exposed surface of a display panel, wherein when the predetermined pattern is input to the display panel, a second frame is moved in a first direction from a first frame, and wherein the predetermined pattern includes touch inputs that occur in a predetermined sequence in a plurality of predetermined regions on the externally exposed surface;
    moving the second frame, which is connected to the first frame to which a first end of the display panel is fixed, in the first direction with respect to the first frame or in a second direction with respect to the first frame; and
    allowing a second end of the display panel, which is in a floating state, to be guided by the second frame, so that an area of the externally exposed surface is widened when the second frame is moved in the first direction and so that the display panel folds and the area of the externally exposed surface is narrowed when the second frame is moved in the second direction.

14. The method of claim 13, wherein the moving of the second frame in the first direction is performed when a proximity signal is generated from a proximity sensor,
    wherein the second direction is a direction opposite to the first direction.

15. The method of claim 13, wherein the moving of the second frame in the first direction is performed when no proximity signal is generated from a proximity sensor.

16. The method of claim 13, wherein the predetermined pattern is a pattern in which a touch input is maintained in a first region of the externally exposed surface for at least a predetermined time, and a touch input to a second region of the externally exposed surface from the first region occurs sequentially to the touch input maintained in the first region,
> wherein the second region is located in the first direction from the first region.

17. The method of claim 13, wherein the predetermined pattern is a pattern in which a touch input repeatedly occurs in a first region of the externally exposed surface at a predetermined time interval.

18. The method of claim 13, wherein the display panel includes a fingerprint recognition region of the externally exposed surface,
> wherein the predetermined pattern is a touch input within the fingerprint recognition region, and the touch input comprises a predetermined fingerprint pattern.

* * * * *